United States Patent [19]

Nishizawa et al.

[11] 4,311,621

[45] Jan. 19, 1982

[54] PROCESS FOR PRODUCING A FILLER FOR ADHESIVE FOR BONDING WOOD

[75] Inventors: Yoshihiko Nishizawa; Toshio Furukawa, both of Noda; Teruo Goto; Hirotsugu Onishi, both of Matsue, all of Japan

[73] Assignee: Kikkoman Corporation, Noda, Japan

[21] Appl. No.: 143,187

[22] Filed: Apr. 24, 1980

[30] Foreign Application Priority Data

Apr. 26, 1979 [JP] Japan .................................. 54-50857
Apr. 27, 1979 [JP] Japan .................................. 54-51525

[51] Int. Cl.$^3$ ...................... B32B 21/08; B32B 27/42; C08L 1/02; C09J 3/04
[52] U.S. Cl. .................................. 260/17.2; 156/328; 260/9; 260/17.3; 428/528; 428/529; 536/56
[58] Field of Search .................. 536/56; 426/510, 523, 426/461, 621; 260/17.4 CL, 17.2, 17.3, 9; 156/328; 428/528, 529

[56] References Cited

U.S. PATENT DOCUMENTS

| | | | |
|---|---|---|---|
| 1,945,946 | 2/1934 | McKay | 426/621 |
| 2,282,783 | 5/1942 | Musher | 426/621 |
| 2,534,648 | 12/1950 | Wilbur | 426/510 |
| 2,643,953 | 6/1953 | Schoen | 536/56 |
| 3,025,250 | 3/1962 | Herrick et al. | 156/328 |
| 3,429,770 | 2/1969 | Ayers | 428/529 |
| 3,616,201 | 10/1971 | Trocino | 428/529 |
| 3,663,719 | 5/1972 | Gnaedinger | 426/510 |
| 3,667,961 | 6/1972 | Algeo | 426/447 |
| 3,817,786 | 6/1974 | Algeo | 426/447 |
| 4,105,606 | 8/1978 | Forss et al. | 156/335 |
| 4,109,057 | 8/1978 | Nakamura et al. | 260/17.3 |
| 4,136,207 | 1/1979 | Bender | 426/510 |

FOREIGN PATENT DOCUMENTS

| | | | |
|---|---|---|---|
| 46-5008 | 2/1971 | Japan | 426/510 |
| 54-2262 | 2/1979 | Japan | 426/510 |

OTHER PUBLICATIONS

Journal of Hokkaido Forest Product Research Institute, vol. 270, pp. 1–5, (1974).

*Primary Examiner*—Ronald W. Griffin
*Attorney, Agent, or Firm*—Schuyler, Banner, Birch, McKie & Beckett

[57] ABSTRACT

A process for producing a filler for adhesive for bonding wood which comprises contacting a raw material of filler for adhesive composed of a vegetable cellulosic material with saturated steam or superheated steam and thereby heat-treating it.

16 Claims, No Drawings

PROCESS FOR PRODUCING A FILLER FOR ADHESIVE FOR BONDING WOOD

This invention relates to a process for producing a filler for adhesive. More particularly, it relates to a process for producing a cellulosic filler for adhesive for bonding wood.

Amino resin adhesives such as urea, melamine, urea-melamine and the like and phenolic resin adhesives such as phenol, resorcinol, phenol-resorcinol and the like are used in many fields for bonding wood materials such as wood works, bonded woods, plywoods, particle boards and the like. In using these adhesives, powdered vegetable materials such as nut shells (for example, walnut shell, coconut shell, ivory nut shell, horse chestnut shell, peanut shell, chestnut shell and the like), wood flours, barks, leaves, corncob, rice hull and the like are usually mixed into said adhesives as a filler either alone or in combination with a diluent such as wheat flour or the like for the purpose of preventing the overpenetration of adhesive into wood, retaining a uniform viscosity facilitating the spreading work, preventing the formation of interstices and cracks accompanying the shrinkage and aging after adhesion, etc.

Though studies on filler have been conducted in many phases, most of them are concerned with a novel utilization of hitherto unused material as a filler or the so-called use development, excepting a few reports concerning the effect brought about by a heat-treatment of wood flours or the effect of particle size (M. KUBOTA and M. SAITO; Journal of the Hokkaido Forest Product Research Institute 270, 1–5, 1974).

The present inventors studied the physicochemical properties of these fillers in adhesives. As the result, it was found that various effects of a filler can remarkably be improved by contacting the raw material of filler constituted of a vegetable cellulosic material with saturated steam or superheated steam and thereby heat-treating it. Based on this finding, this invention was accomplished.

An object of this invention is to provide a process for producing a filler for adhesive for bonding wood.

Another object of this invention is to provide an excellent filler composed of vegetable cellulosic material for adhesive for bonding wood.

Further objects and advantages of this invention will be apparent from the following description.

According to this invention, there is provided a process for producing a filler for adhesive for bonding wood which comprises contacting a raw material of filler for adhesive composed of vegetable cellulosic material with saturated steam or superheated steam and thereby heat-treating it.

This invention will be concretely explained below.

In this invention, examples of the raw material of filler for adhesive composed of a vegetable cellulosic material include nut shells (for example, walnut shell, coconut shell, ivory nut shell, horse chestnut shell, peanut shell, chestnut shell and the like), wood flours, barks, leaves, corncob, rice hull and the like.

In this invention, the raw material of filler for adhesive composed of these vegetable cellulosic materials is directly, or after pulverization, contacted with saturated steam or superheated steam for the sake of heat-treatment.

The saturated steam used for the heat-treatment may be of ordinary pressure or of elevated pressure. However, a saturated steam having an elevated pressure of 1.0 kg/cm$^2$ G or more is preferably used, and that having an elevated pressure of 2.0–15.0 kg/cm$^2$ G is more preferably used. In the above, the symbole "G" means "gauge", and the same shall apply hereinafter.

As the superheated steam, a superheated steam of 110° C. or higher and preferably 140°–300° C. is suitable. The superheated steam may also be used either at ordinary pressure or at elevated pressure.

When a steam having an elevated pressure is used, it is preferable that the pressure is rapidly released after the heat treatment to puff the raw material of filler.

Though the time period of heat-treatment varies depending on the kind of steam (saturated or superheated), temperature, the kind of the raw material of filler, its shape (particle size) and the like, it is not specifically restricted, but preferably in the range of about 5 seconds to 2 hours.

Though the heat-treatment may be carried out by any of continuous or batch-wise processes, a continuous treatment is more preferable in point of workability or the like. As the concrete apparatus for the heat-treatment, the disclosed gas-solid contact apparatuses of fluidized type, through flow type, pneumatic conveyer type, screw conveyer type, velt conveyer type or rotary kiln type can be used, for example. Further, when an elevated pressure steam is used for the heat-treatment and the subsequent puffing, the disclosed puffing apparatuses, frequently employed in the field of foodstuffs for example, may be used. For example, as the batch-wise one, an apparatus so devised that a material to be treated is thrown into a capped closed vessel and simultaneously a high pressure steam is introduced into the closed vessel to heat-treat the material and, after arrival to the appointed pressure, the closed vessel is rapidly opened to puff the material can be used. As the continuous one, the apparatuses disclosed in, for example, Japanese Patent Publication No. 26,695/1970, Japanese Patent Publication No. 34,747/1971, Japanese Patent Publication No. 1,549/1974 or Japanese Patent Kokai (Laid-Open) No. 79,073/1978 can be used preferably.

Then, the raw material of filler composed of a vegetable cellulosic material which has been contacted and heat-treated with saturated steam or superheated steam as above is dried by an appropriate method to a water content of about 3–15% and subsequently pulverized if necessary, whereby a filler is obtained. When the heat-treatment is carried out with superheated steam, the raw material of filler heat-treated is already in dry state, so that no drying treatment is necessary in many cases.

The filler composed of vegetable cellulosic material thus obtained is mixed into a resin adhesive and then put to use in the same manner as prior fillers. As compared with fillers composed of vegetable cellulosic material which have not been treated or heat-treated with hot air, the filler composed of vegetable cellulosic material produced according to this invention is improved in adhesion, has a smaller variability of quality or so denatured as to have an appropriate water absorption, so that it is quite excellent as a filler to be mixed into resin adhesives. In addition, unlike a process which comprises heat-treating a raw material of filler composed of vegetable cellulosic material with hot air, the process of this invention is free from scorching, ignition, explosion etc. in the process of heat-treatment, which is a quite excellent effect from the industrial point of view. Therefore, the process of this invention is useful as a process for producing a filler for adhesive.

With reference to the following examples, this invention and its effect will be illustrated concretely. In the tables shown in the examples, saturated steam is abbreviated to SS and superheated steam is abbreviated to SHS.

EXAMPLE 1

Sample 1 and sample 2 were prepared by sealing a commercial walnut shell powder (water content 13.3%) in a pressure vessel, contacting it with saturated steams of 3 kg/cm$^2$ G and 6 kg/cm$^2$ G respectively for 5 minutes for the sake of heat-treatment, instantaneously releasing the pressure to puff the material and drying it in an oven at 60° C. for 30 minutes until a water content of 11.2–11.6% was reached (sample 1 was contacted with saturated steam of 3 kg/cm$^2$ G and sample 2 was contacted with that of 6 kg/cm$^2$ G). Sample 3 and sample 4 were prepared by contacting the raw material with superheated steam of no pressure at 140° C. or 180° C., respectively, for 30 minutes for the sake of heat-treatment by means of a fluidized type gas-solid contact apparatus (sample 3 was contacted with superheated steam of no pressure at 140° C. and sample 4 was contacted with that of no pressure at 180° C.). Sample 5 and sample 6 were prepared by contacting the raw material with superheated steam of 3 kg/cm$^2$ G at 160° C. and 6 kg/cm$^2$ G at 180° C. respectively for 3 minutes by means of the puff apparatus with fluidized bed (Japanese Patent Publication No. 26,695/1970) for the sake of heating and puffing treatment (sample 5 was contacted with superheated steam of 3 kg/cm$^2$ G at 160° C. and sample 6 was contacted with that of 6 kg/cm$^2$ G at 180° C.).

These samples were adjusted to 150 mesh on the average, and their 4 parts were added and mixed into 100 parts of phenol-formaldehyde resin (resin content 48%, initial viscosity 3.8 poise at 20° C.). The resulting mixtures were used as wood adhesive and the adhesions were compared. The results are shown in Table 1, wherein control 1 is the same walnut shell powder as above subjected to no reatment and having an adjusted average size of 150 mesh, while control 2 is a sample prepared by heat-treating the same walnut shell powder with ho air of 180° C. for 30 minutes an adjusting the average size to 150 mesh. All he fillers (samples 1–6 and controls 1–2) were made to have a constant water content of about 13% in a room having a temperature of 20° C. and a relative humidity of 60% before they were added to adhesive, with consideration of nullifying the effect of water content on the test.

The test pieces used in the dry test and the repeated boiling test (water soak treatment) shown in Table 1 were prepared according to JAS of plywood by the following procedure:

Birch having a thickness of 1.5 mm, 3-ply equal thickness construction, spread 30 g/30 cm×30 cm, prepress under 10 kg/cm$^2$ for 20 minutes, hot press at 135° C., for 3 minutes and 45 seconds under 10 kg/cm$^2$.

The mean value, the highest value, the lowest value and the standard deviation mentioned in Table 1 were determined from the results of test using 24 test pieces.

TABLE 1

| | Filler | Sample 1 | Sample 2 | Sample 3 | Sample 4 | Sample 5 | Sample 6 | Control 1 | Control 2 |
|---|---|---|---|---|---|---|---|---|---|
| Conditions of heat-treatment | Steam | SS | SS | SHS | SHS | SHS | SHS | — | Hot air |
| | Temperature (°C.) | 143 | 164 | 140 | 180 | 160 | 180 | — | 180 |
| | Pressure (kg/cm$^2$ G) | 3 | 6 | 0 | 0 | 3 | 6 | — | 0 |
| | Time (min) | 5 | 5 | 30 | 30 | 3 | 3 | — | 30 |
| | Puffing treatment | Done | Done | Not done | Not done | Done | Done | — | Not done |
| Characteristic properties of adhesive | Viscosity (poise)* | 6.7 | 6.8 | 7.1 | 7.2 | 6.5 | 6.3 | 7.3 | 7.0 |
| | Preliminary adhesion | Good | Good | Good | Good | Good | Good | Good | Good |
| Dry test** (kg/cm$^2$) | Mean | 22.4 | 22.9 | 23.1 | 24.7 | 24.9 | 26.5 | 20.6 | 21.8 |
| | Highest | 28.3 | 30.3 | 30.0 | 31.2 | 32.5 | 32.3 | 24.6 | 28.0 |
| | Lowest | 18.9 | 19.5 | 18.3 | 20.1 | 22.1 | 22.7 | 15.8 | 16.3 |
| | Standard deviation | 3.25 | 3.10 | 3.28 | 3.14 | 2.35 | 2.22 | 3.30 | 3.32 |
| | Wood failure (%) | 4.2 | 8.9 | 6.2 | 8.5 | 10.1 | 11.3 | 2.4 | 3.6 |
| Repeated boiling test** (kg/cm$^2$) | Mean | 26.3 | 26.9 | 24.5 | 25.3 | 27.2 | 28.4 | 19.4 | 21.3 |
| | Highest | 33.3 | 32.2 | 31.2 | 33.4 | 34.6 | 34.8 | 28.0 | 28.5 |
| | Lowest | 21.6 | 22.5 | 19.8 | 20.4 | 21.8 | 23.5 | 15.7 | 16.2 |
| | Standard deviation | 3.93 | 2.83 | 3.95 | 3.87 | 3.12 | 2.78 | 4.48 | 4.37 |
| | Wood failure (%) | 23.2 | 27.5 | 25.4 | 27.1 | 31.0 | 36.2 | 5.7 | 11.4 |

(Notes)
*The viscosity 3 minutes after mixing adhesive and filler.
**Measured according to JAS of plywood.

The results shown in Table 1 demonstrate that the samples containing the filler obtained according to this invention have an improved adhesion as compared with the control samples and give a smaller deviation so that the products of this invention are excellent as a filler.

EXAMPLE 2

Product A was produced by directly heat-treating peanut shell (legume) (water content, 15.4%) obtainable as an industrial waste in confectionaries in a pressure vessel with saturated steam of 4 kg/cm$^2$ G for 5 minutes and then slowly releasing the pressure. Product B was produced by heat-treating the same raw material under the same conditions as above and then rapidly releasing the pressure to puff the material. Products C and D were produced by heat-treating the same raw material with saturated steam of no pressure for 15 minutes (C) and 30 minutes (D). Fillers were produced from products A, B, C and D by drying them in an oven at 60° C. for 30 minutes to adjust the water content 12.5–13.5% and the pulverizing them with an impact type pulverizer to an average size of 200 mesh. The fillers obtained from products A, B, C and D are referred to as samples 1, 2, 3 and 4, respectively.

Samples 5 and 6 were prepared by heat-treating the same peanut shell as above with superheated steam under the conditions shown in Table 2 in the same manner as in Example 1 and then pulverizing them in the same manner as above.

Each 4 parts of the fillers thus obtained was mixed into 100 parts of phenol-formaldehyde resin (resin content 48%, initial viscosity 3.8 poise at 20° C.) and used as a wood adhesive to compare the adhesion one another. Control 1 was a sample prepared by directly pulverizing the same peanut shell as above to an average size of 200 mesh. Control 2 was prepared by heat-treating the same peanut shell with a hot air of 180° C. for 30 minutes and then pulverizing it to an average size of 200 mesh. All the fillers (samples 1–6 and controls 1–2) were made to have a constant water content of about 12% in a room having a temperature of 20° C. and a relative humidity of 60% before they were added to adhesive, with consideration of nullifying the effect of water on the test.

Preparation of test pieces and practice of the test were in the same manner as in Example 1.

The results shown in Table 2 demonstrate that samples 1–6 obtained according to this invention have a higher adhesion as compared with controls 1–2 and give a small deviation so that they are effective as a filler.

EXAMPLE 3

Wood flour having a water content of 14.3% obtained by pulverizing silver fir lumber and Uruchi rice hull having a water content of 13.2% were pulverized to average sizes of 150 mesh and heat-treated under the conditions shown in Tables 3 and 4 in the same manner as in Example 2 to give fillers.

These fillers were mixed into resin in the proportions shown in Tables 3 and 4 and the adhesions were tested in the same manner as in Example 1. The results are shown in Tables 3 and 4.

TABLE 3

| | Filler | Sample 1 | Sample 2 | Sample 3 | Sample 4 | Sample 5 | Sample 6 | Control 1 | Control 2 |
|---|---|---|---|---|---|---|---|---|---|
| | Steam | SS | SS | SS | SS | SHS | SHS | — | Hot air |
| Conditions of | Temperature (°C.) | 164 | 164 | 100 | 100 | 180 | 180 | — | 180 |
| heat-treatment | Pressure (kg/cm$^2$ G) | 6 | 6 | 0 | 0 | 0 | 6 | — | 0 |
| | Time (minute) | 10 | 10 | 30 | 30 | 30 | 5 | — | 30 |
| | Puffing treatment | Not done | Done | Not done | Not done | Not done | Done | — | Not done |
| | Resin* | 100 | 100 | 100 | 100 | 100 | 100 | 100 | 100 |
| Composition of | | | | | | | | | |
| adhesive | Woodmeal | 10 | 10 | 20 | 10 | 10 | 10 | 10 | 10 |
| | Wheat flour | 10 | 10 | — | 10 | 10 | 10 | 10 | 10 |
| | NH$_4$Cl (10%) | 10 | 10 | 10 | 10 | 10 | 10 | 10 | 10 |
| Characteristic | Viscosity (poise) | 14.5 | 13.8 | 16.4 | 15.1 | 14.0 | 13.1 | 18.2 | 17.5 |
| properties of | | | | | | | | | |
| adhesive | Preliminary adhesion | Good | Good | Good | Good | Good | Good | Good | Good |
| | Mean | 30.2 | 31.4 | 29.7 | 29.8 | 31.1 | 32.5 | 27.5 | 28.7 |
| Dry test | Highest | 35.7 | 40.3 | 37.2 | 36.3 | 40.1 | 41.2 | 33.5 | 37.1 |
| (kg/cm$^2$) | Lowest | 25.2 | 26.2 | 24.2 | 24.8 | 25.4 | 26.7 | 21.5 | 22.1 |
| | Standard deviation | 3.14 | 3.02 | 3.83 | 3.51 | 3.13 | 3.01 | 4.73 | 4.11 |
| | Wood failure (%) | 82.3 | 88.5 | 80.2 | 83.1 | 91.0 | 94.0 | 70.3 | 75.4 |
| | Mean | 20.5 | 21.2 | 19.8 | 20.2 | 21.6 | 22.1 | 13.4 | 14.6 |
| Hot-cold water | Highest | 27.4 | 29.2 | 27.3 | 28.7 | 30.6 | 31.2 | 23.4 | 25.2 |
| immersion test | Lowest | 14.3 | 15.7 | 12.7 | 13.4 | 17.2 | 17.1 | 8.7 | 10.5 |
| (kg/cm$^2$) | Standard deviation | 3.56 | 3.42 | 4.13 | 4.05 | 3.41 | 3.33 | 4.70 | 4.21 |
| | Wood failure (%) | 27.2 | 30.5 | 20.2 | 22.1 | 30.0 | 31.2 | 14.2 | 15.6 |

(Note)
*Urea-formaldehyde resin (resin content 50%, initial viscosity 5.7 poise)

TABLE 2

| | Filler | Sample 1 | Sample 2 | Sample 3 | Sample 4 | Sample 5 | Sample 6 | Control 1 | Control 2 |
|---|---|---|---|---|---|---|---|---|---|
| | Steam | SS | SS | SS | SS | SHS | SHS | — | Hot air |
| Conditions of | Temperature (°C.) | 151 | 151 | 100 | 100 | 180 | 160 | — | 180 |
| heat-treatment | Pressure (kg/cm$^2$ G) | 4 | 4 | 0 | 0 | 0 | 3 | — | 0 |
| | Time (minute) | 5 | 5 | 15 | 30 | 30 | 3 | — | 30 |
| | Puffing treatment | Not done | Done | Not done | Not done | Not done | Done | — | Not done |
| Characteristic | Viscosity (poise) | 7.5 | 7.4 | 7.5 | 7.6 | 7.2 | 7.0 | 7.8 | 7.7 |
| properties of | | | | | | | | | |
| adhesive | Preliminary adhesion | Good | Good | Good | Good | Good | Good | Good | Good |
| | Mean | 22.1 | 23.6 | 21.5 | 22.5 | 23.8 | 24.7 | 20.9 | 21.2 |
| Dry test ** | Highest | 28.4 | 28.0 | 29.1 | 29.8 | 31.2 | 32.5 | 25.4 | 27.4 |
| (kg/cm$^2$) | Lowest | 18.6 | 19.5 | 18.4 | 18.7 | 21.7 | 21.5 | 16.4 | 18.3 |
| | Standard deviation | 2.33 | 2.09 | 2.45 | 2.43 | 2.11 | 2.02 | 2.47 | 3.04 |
| | Wood failure (%) | 8.6 | 10.2 | 7.5 | 7.8 | 11.5 | 16.7 | 2.5 | 4.2 |
| | Mean | 23.8 | 24.4 | 24.0 | 24.8 | 24.7 | 25.2 | 23.3 | 22.8 |
| Repeated boiling | Highest | 29.7 | 29.5 | 29.3 | 30.1 | 30.5 | 33.1 | 30.5 | 29.7 |
| test ** | Lowest | 19.7 | 19.3 | 19.8 | 19.5 | 20.3 | 20.2 | 19.3 | 19.8 |
| (kg/cm$^2$) | Standard deviation | 3.14 | 3.10 | 3.12 | 3.20 | 3.11 | 3.05 | 3.26 | 3.15 |
| | Wood failure (%) | 18.4 | 22.5 | 15.3 | 16.4 | 25.4 | 34.4 | 6.3 | 7.5 |

(Notes)
* The viscosity 3 minutes after mixing adhesive and filler.
** Measured according to JAS of plywood.

TABLE 4

| | Filler | Sample 1 | Sample 2 | Sample 3 | Sample 4 | Control 1 | Control 2 |
|---|---|---|---|---|---|---|---|
| | Steam | SS | SS | SHS | SHS | — | Hot air |
| Conditions of | Temperature (°C.) | 164 | 164 | 180 | 180 | — | 180 |
| heat-treatment | Pressure (kg/cm$^2$ G) | 6 | 6 | 0 | 3 | — | 0 |

TABLE 4-continued

|  | Filler | Sample 1 | Sample 2 | Sample 3 | Sample 4 | Control 1 | Control 2 |
|---|---|---|---|---|---|---|---|
|  | Time (minute) | 2 | 2 | 30 | 1 | — | 30 |
|  | Puffing treatment | Not done | Done | Not done | Done | — | Not done |
|  | Resin* | 100 | 100 | 100 | 100 | 100 | 100 |
| Composition and | Uruchi rice hull powder | 4 | 4 | 4 | 4 | 4 | 4 |
| characteristics | Viscosity (poise) | 7.5 | 8.1 | 7.6 | 8.4 | 5.8 | 6.2 |
| of adhesives | Preliminary adhesion | Good | Good | Good | Good | Good | Good |
|  | Mean | 25.2 | 26.0 | 25.8 | 26.6 | 23.8 | 24.0 |
| Dry test | Highest | 28.9 | 29.5 | 30.1 | 31.5 | 30.9 | 29.2 |
| (kg/cm$^2$) | Lowest | 19.7 | 19.8 | 20.3 | 20.2 | 18.2 | 18.7 |
|  | Standard deviation | 2.57 | 2.42 | 2.45 | 2.23 | 3.73 | 3.65 |
|  | Wood failure (%) | 46.4 | 47.0 | 48.4 | 51.2 | 31.5 | 42.1 |
|  | Mean | 22.4 | 23.0 | 22.9 | 23.7 | 20.8 | 21.2 |
| Repeated boiling | Highest | 28.4 | 27.7 | 28.9 | 28.8 | 24.6 | 25.1 |
| test | Lowest | 17.7 | 18.3 | 18.7 | 19.6 | 15.5 | 14.6 |
| (kg/cm$^2$) | Standard deviation | 2.42 | 2.16 | 2.21 | 2.08 | 2.60 | 2.78 |
|  | Wood failure (%) | 54.8 | 57.6 | 60.3 | 62.1 | 45.0 | 48.3 |

(Note)
*Phenol-formaldehyde resin (resin content 48%, initial viscosity 3.8 poise).

The results of Tables 3 and 4 demonstrate that, similarly to the cases of Example 1 and Example 2, the fillers treated with saturated steam or superheated steam are improved in adhesion and give a very small deviation.

EXAMPLE 4

Burs (water content 15%) of a chestnut (Ginyori) collected from a chestnut garden were appropriately crushed by means of an impact type pulverizer, heat-treated in a pressure vessel with saturated steam of 4 kg/cm$^2$ G for 5 minutes and then slowly released from the pressure to give product A. The same raw material was heat-treated under the same conditions and then the pressure was rapidly released to puff the material, whereby product B was obtained. The same raw material was heat-treated with saturated steam of no pressure for 15 minutes to give product C. Chestnut-bur powders were prepared from products A, B and C by drying them in an oven at 60° C. for 1 hour to adjust their water content to 14% and then pulverizing them to an average size of 100 mesh. The chestnut-bur powders obtained from A, B and C are referred to as samples 1, 2 and 3.

Aside from above, product D was prepared by heat-treating the same chestnut-bur as above by contacting it with superheated steam (no pressure, 180° C.) for 30 minutes by means of a fluidized gas-solid contact apparatus, and product E was prepared by heating and puffing the same raw material by contacting it with superheated steam (6 kg/cm$^2$ G, 180° C.) for 15 seconds by means of a pneumatic conveyer type puffing apparatus (Japanese Patent Publication No. 34,747/1971). Chestnut-bur powders were prepared from products D and E by pulverizing them in the same manner as above. The chestnut-bur powders obtained from D and E are referred to as samples 4 and 5.

In order to examine the effects of these chestnut-bur powders as a filler for adhesive, each 4 parts of these chestnut-bur powders was mixed into 100 parts of phenol-formaldehyde resin (resin content 48%) and tested for adhesion. The results obtained are shown in Table 5.

Control 1 is a commerical walnut shell powder filler, and control 2 is a silver fir wood flour. All the fillers were made to have a constant water content of about 13% in a room having a temperature of 20° C. and a relative humidity of 60% before they were added to adhesive, with consideration of nullifying the effect of water on the test.

The test pieces used for the dry test and repeated boiling test of Table 5 were prepared by the following procedure according to JAS of plywood.

Birch having a thickness of 1.5 mm, 3-ply equal thickness construction, spread 30 g/30 cm × 30 cm, prepress under 10 kg/cm$^2$ for 20 minutes, hot press at 135° C. for 3 minutes and 45 seconds under 10 kg/cm$^2$.

The means value, the highest value, the lowest value and the standard deviation mentioned in Table 5 were determined from the results of test using 24 test pieces.

TABLE 5

|  | Filler | Sample 1 | Sample 2 | Sample 3 | Sample 4 | Sample 5 | Control 1 | Control 2 |
|---|---|---|---|---|---|---|---|---|
|  | Steam | SS | SS | SS | SHS | SHS | — | — |
| Conditions of | Temperature (°C.) | 151 | 151 | 100 | 180 | 180 | — | — |
| heat-treatment | Pressure (kg/cm$^2$ G) | 4 | 4 | 0 | 0 | 6 | — | — |
|  | Time (minute) | 5 | 5 | 15 | 30 | 0.25 | — | — |
|  | Puffing treatment | Not done | Done | Not done | Not Done | Done | — | — |
| Characteristic properties of | Viscosity (poise)* | 7.4 | 7.2 | 7.8 | 7.1 | 7.0 | 7.3 | 0.8 |
| adhesive | Preliminary adhesion | Good | Good | Good | Good | Good | Good | Good |
|  | Mean | 20.7 | 21.8 | 20.2 | 21.4 | 22.3 | 19.0 | 17.3 |
| Dry test ** | Highest | 27.7 | 28.8 | 25.8 | 28.3 | 28.9 | 24.7 | 22.5 |
| (kg/cm$^2$) | Lowest | 18.0 | 18.8 | 17.9 | 18.2 | 18.7 | 14.2 | 12.3 |
|  | Standard deviation | 2.44 | 2.23 | 2.55 | 2.40 | 2.10 | 3.01 | 3.84 |
|  | Wood failure (%) | 61.4 | 66.7 | 58.9 | 72.3 | 77.4 | 41.0 | 28.1 |
|  | Mean | 22.2 | 22.8 | 21.3 | 22.7 | 24.2 | 17.4 | 15.7 |
| Repeated boiling | Highest | 30.2 | 31.1 | 29.6 | 31.5 | 33.2 | 23.5 | 22.1 |
| test ** | Lowest | 18.9 | 19.6 | 18.8 | 19.7 | 20.4 | 10.2 | 9.8 |
| (kg/cm$^2$) | Standard deviation | 3.27 | 3.12 | 3.51 | 3.17 | 3.05 | 3.45 | 4.52 |

TABLE 5-continued

| Filler | Sample 1 | Sample 2 | Sample 3 | Sample 4 | Sample 5 | Control 1 | Control 2 |
|---|---|---|---|---|---|---|---|
| Wood failure (%) | 65.3 | 73.0 | 70.1 | 75.4 | 80.2 | 52.4 | 20.0 |

(Note)
*The viscosity 3 minutes after mixing adhesive and filler.
** Measured according to JAS of plywood.

The results of Table 5 demonstrate that the adhesives containing the filler of this invention are much superior in adhesion to the control samples.

EXAMPLE 5

The pericarp of Tsukuba chestnut was dried with hot air to a water content of 14.2% and pulverized to an average size of 100 mesh by means of turbomill type pulverizer to give a chestnut pericarp powder (sample 1).

On the other hand, the same chestnut pericarp as above was heat-treated under the conditions shown in Table 6 in the same manner as in Example 1 and then pulverized to give chestnut pericarp powders referred to as samples 2–6.

These powders were mixed into the same adhesive in the same proportion as in Example 4 and tested for adhesion in the same manner as in Example 4 except that the wood test pieces were dried to a water content of 13%. The results obtained were as shown in Table 6.

TABLE 6

| | Filler | Sample 1 | Sample 2 | Sample 3 | Sample 4 | Sample 5 | Sample 6 |
|---|---|---|---|---|---|---|---|
| Conditions of heat-treatment | Steam | — | SS | SS | SS | SHS | SHS |
| | Temperature (°C.) | — | 164 | 164 | 100 | 180 | 180 |
| | Pressure (kg/cm² G) | — | 6 | 6 | 0 | 0 | 6 |
| | Time (minute) | — | 5 | 5 | 15 | 30 | 0.25 |
| | Puffing treatment | — | Not done | Done | Not done | Not done | Done |
| Characteristic properties of adhesive | Viscosity (poise)* | 7.9 | 6.8 | 6.9 | 7.1 | 6.7 | 6.5 |
| adhesive | Preliminary adhesion | Good | Good | Good | Good | Good | Good |
| Dry test** (kg/cm²) | Mean | 20.5 | 23.4 | 24.3 | 21.2 | 24.0 | 25.4 |
| | Highest | 29.4 | 31.0 | 33.0 | 31.3 | 32.1 | 33.5 |
| | Lowest | 18.5 | 19.4 | 19.3 | 18.6 | 19.1 | 20.2 |
| | Standard deviation | 2.78 | 2.44 | 2.34 | 2.57 | 2.22 | 2.40 |
| | Wood failure (%) | 56.0 | 72.4 | 72.1 | 67.4 | 76.5 | 78.0 |
| Repeated boiling test** (kg/cm²) | Mean | 20.2 | 22.8 | 23.4 | 20.6 | 23.7 | 24.4 |
| | Highest | 28.1 | 29.7 | 31.2 | 30.5 | 31.7 | 32.3 |
| | Lowest | 15.4 | 16.8 | 16.9 | 15.6 | 16.8 | 17.3 |
| | Standard deviation | 3.21 | 3.05 | 3.00 | 3.14 | 2.95 | 2.87 |
| | Wood failure (%) | 43.2 | 52.1 | 55.5 | 50.2 | 60.4 | 62.3 |

(Note)
*The viscosity 3 minutes after mixing adhesive and filler.
**Measured according to JAS of plywood.

The results of Table 6 demonstrate that chestnut pericarp powder has the same effect as that of chestnut-bur powder. A powder obtained from the seed coat of chestnut in the same manner as above also gave comparable results.

EXAMPLE 6

20 parts of sample 5 (chestnut pericarp powder heat-treated with superheated steam of no pressure at 180° C. for 30 minutes) of Example 5 was mixed, as a filler, into 100 parts of urea-formaldehyde resin. From the mixture, test pieces were prepared by repeating the procedure of Example 1 except that hot press were made at 100° C. for 3 minutes and 30 seconds under 10 kg/cm² and the wood test pieces were not dried, and the test pieces were tested for adhesion. As the result, they exhibited a good preliminary adhesion. According to the prescription of JAS, the result of dry test was 31.5 kg/cm² on the average and the result of hot-cold water immersion test was 23.4 kg/cm² on the average.

What is claimed is:

1. An adhesive composition for bonding wood products comprising a thermosetting resin adhesive and a vegetable cellulosic filler material produced by a method comprising contacting a raw material composed of a vegetable cellulosic material with saturated steam or superheated steam to heat-treat it.

2. An adhesive composition for bonding wood products comprising a thermosetting resin adhesive and a vegetable cellulosic filler material produced by a method comprising contacting a raw material composed of a vegetable cellulosic material with saturated steam or superheated steam to heat-treat it and then rapidly releasing it into a lower pressure to puff it.

3. A process for making an adhesive composition for bonding wood products comprising mixing a thermosetting resin adhesive with a vegetable cellulosic filler material produced by a method comprising contacting a raw material composed of a vegetable cellulosic material with saturated steam or superheated steam to heat-treat it.

4. A process for making an adhesive composition for bonding wood products comprising mixing a thermosetting resin adhesive with a vegetable cellulosic filler material produced by a method comprising contacting a raw material composed of a vegetable cellulosic material with saturated steam or superheated steam to heat-treat it and then rapidly releasing it into a lower pressure to puff it.

5. A bonded wood product comprising wood components bonded together with an adhesive composition which comprises a thermosetting resin adhesive and a vegetable cellulosic filler material produced by a method comprising contacting a raw material composed of a vegetable cellulosic material with saturated steam or superheated steam to heat-treat it.

6. A bonded wood product comprising wood components bonded together with an adhesive composition which comprises a thermosetting resin adhesive and a vegetable cellulosic filler material produced by a method comprising contacting a raw material composed of a vegetable cellulosic material with saturated steam or superheated steam to heat-treat it and then rapidly releasing it into a lower pressure to puff it.

7. A process for bonding wood products comprising:
(a) applying an adhesive composition to the wood components to be bonded, said adhesive composition comprising a thermosetting resin adhesive and a vegetable cellulosic filler material produced by a method comprising contacting a raw material composed of a vegetable cellulosic material with saturated steam or superheated steam to heat-treat it, and
(b) curing said adhesive composition to form a bonded wood product.

8. A process for bonding wood products comprising:
(a) applying an adhesive composition to the wood components to be bonded, said adhesive composition comprising a thermosetting resin adhesive and a vegetable cellulosic filler material produced by a method comprising contacting a raw material composed of a vegetable cellulosic material with saturated steam or superheated steam to heat-treat it and then rapidly releasing it into a lower pressure to puff it, and
(b) curing said adhesive composition to form a bonded wood product.

9. The invention according to claims 1, 2, 3, 4, 5, 6, 7 or 8 wherein said thermosetting resin adhesive is selected from the group consisting of amino resins and phenolic resins.

10. The invention according to claims 1, 2, 3, 4, 5, 6, 7 or 8 wherein said wood products are selected from the group consisting of wood works, bonded woods, plywoods and particle boards.

11. The invention according to claims 1, 2, 3, 4, 5, 6, 7 or 8, wherein said vegetable cellulosic material is one member selected from nut shells, wood flours, barks, leaves, corncob and rice hull.

12. A process according to claim 11, wherein said nut shell is one member selected from walnut shell, coconut shell, ivory nut shell, horse chestnut shell, peanut shell and chestnut shell.

13. The invention according to claims 1, 2, 3, 4, 5, 6, 7 or 8, wherein said heat-treatment is carried out with a saturated steam of 2–15kg/cm$^2$ G.

14. The invention according to claims 1, 2, 3, 4, 5, 6, 7 or 8, wherein said heat-treatment is carried out with a superheated steam of 140°–300° C.

15. The invention according to claims 1, 2, 3, 4, 5, 6, 7 or 8, wherein said heat-treatment is carried out by the use of one gas-solid contact apparatus selected from fluidized type, through flow type, pneumatic conveyer type, screw conveyer type, belt conveyer type and rotary kiln type.

16. The invention according to claims 1, 2, 3, 4, 5, 6, 7 or 8, wherein the time period of said heat-treatment is 5 seconds to 2 hours.

* * * * *